(No Model.) 3 Sheets—Sheet 1.

J. FARRELL.
DROP TINE HAY FORK.

No. 418,557. Patented Dec. 31, 1889.

WITNESSES:
A. Schehl.
W. Reinkerr

INVENTOR
John Farrell
BY
Goepel & Raegener
ATTORNEYS.

(No Model.) 3 Sheets—Sheet 2.

J. FARRELL.
DROP TINE HAY FORK.

No. 418,557. Patented Dec. 31, 1889.

WITNESSES:
A. Schzehl.
W. Reimherr

INVENTOR
John Farrell
BY
Goepel & Raegener
ATTORNEYS.

(No Model.) 3 Sheets—Sheet 3.
J. FARRELL.
DROP TINE HAY FORK.
No. 418,557. Patented Dec. 31, 1889.
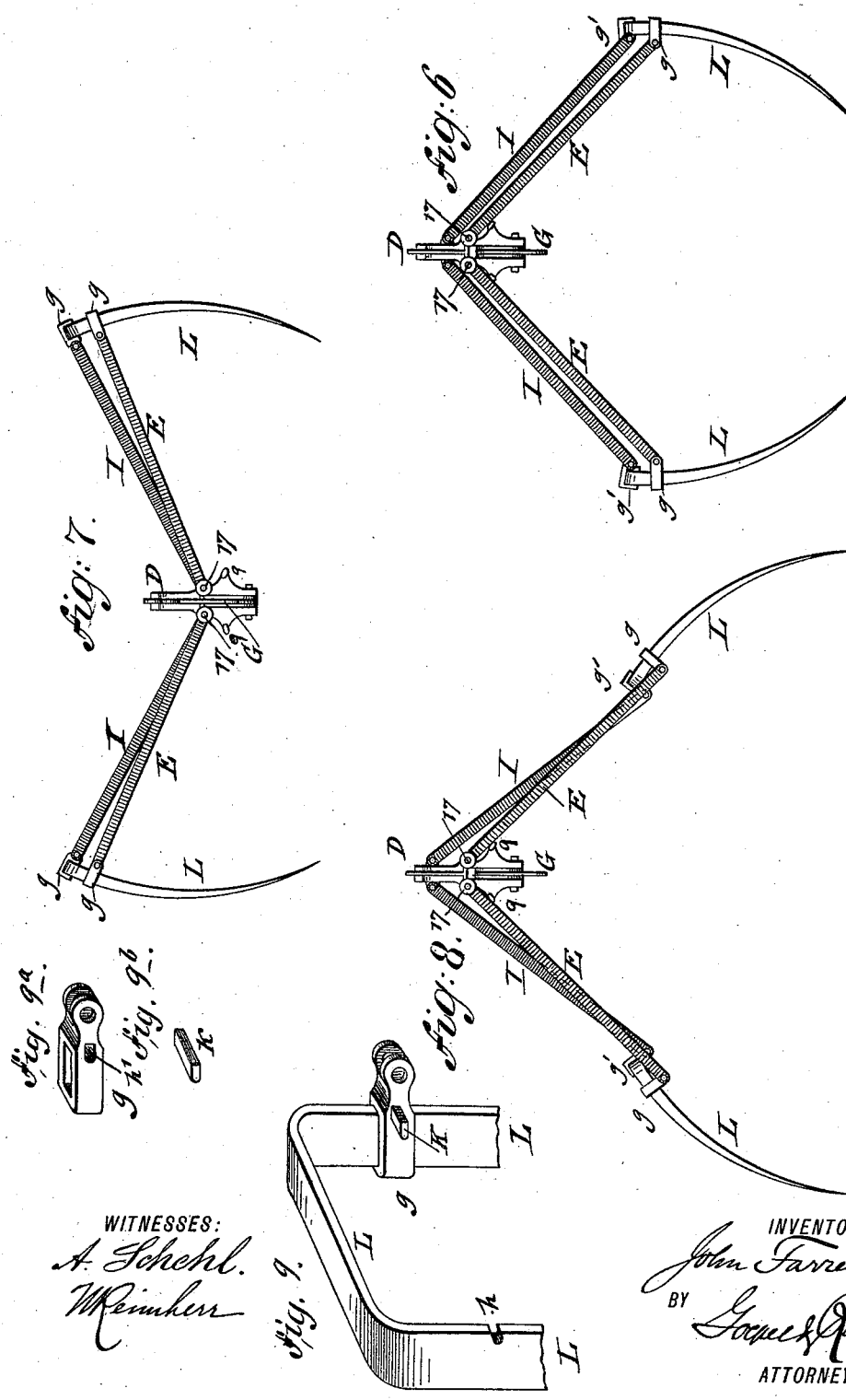
WITNESSES:
A. Schehl.
M. Reinherr
INVENTOR
John Farrell
BY
Goepel & Raegener
ATTORNEYS.

UNITED STATES PATENT OFFICE.

JOHN FARRELL, OF HUNTSVILLE, NEW JERSEY.

DROP-TINE HAY-FORK.

SPECIFICATION forming part of Letters Patent No. 418,557, dated December 31, 1889.

Application filed November 25, 1889. Serial No. 331,509. (No model.)

*To all whom it may concern:*

Be it known that I, JOHN FARRELL, of Huntsville, county of Sussex, and State of New Jersey, a citizen of the United States, have invented certain new and useful Improvements in Drop-Tine Hay-Forks, of which the following is a specification.

This invention has reference to improvements in drop-tine hay-forks of that class by which hay, straw, or similar material is raised from the loaded wagon and transferred to the place of deposit in the barn, where the fork is opened, so as to discharge its load, and then returned to the loading-point; and the invention consists, first, in a shifting device by which the trip-rope and its pulley can be transferred from one side of the fork-supporting carriage to the other, so that the fork can be operated whether it is moved in one direction or the other over the fixed supporting-track of the carriage.

The invention consists, secondly, of a fork-supporting head that is suspended from a traveling carriage, suspension-bars pivoted to said head, tines supported by said suspension-bars, a slide-piece guided vertically in the frame of said fork-head, spreader-bars pivoted to said slide-piece and to said tines, a trip-lever connected to said slide-piece, and toggle-links pivoted to said trip-lever and the fork-head and forming a toggle-joint with said trip-lever, by which the tines are opened or closed or locked for supporting the load.

The invention consists, further, in certain details in the construction of the fork-head and the slide-piece guided in the same, as will be fully described hereinafter, and finally pointed out in the claims.

Figure 1:
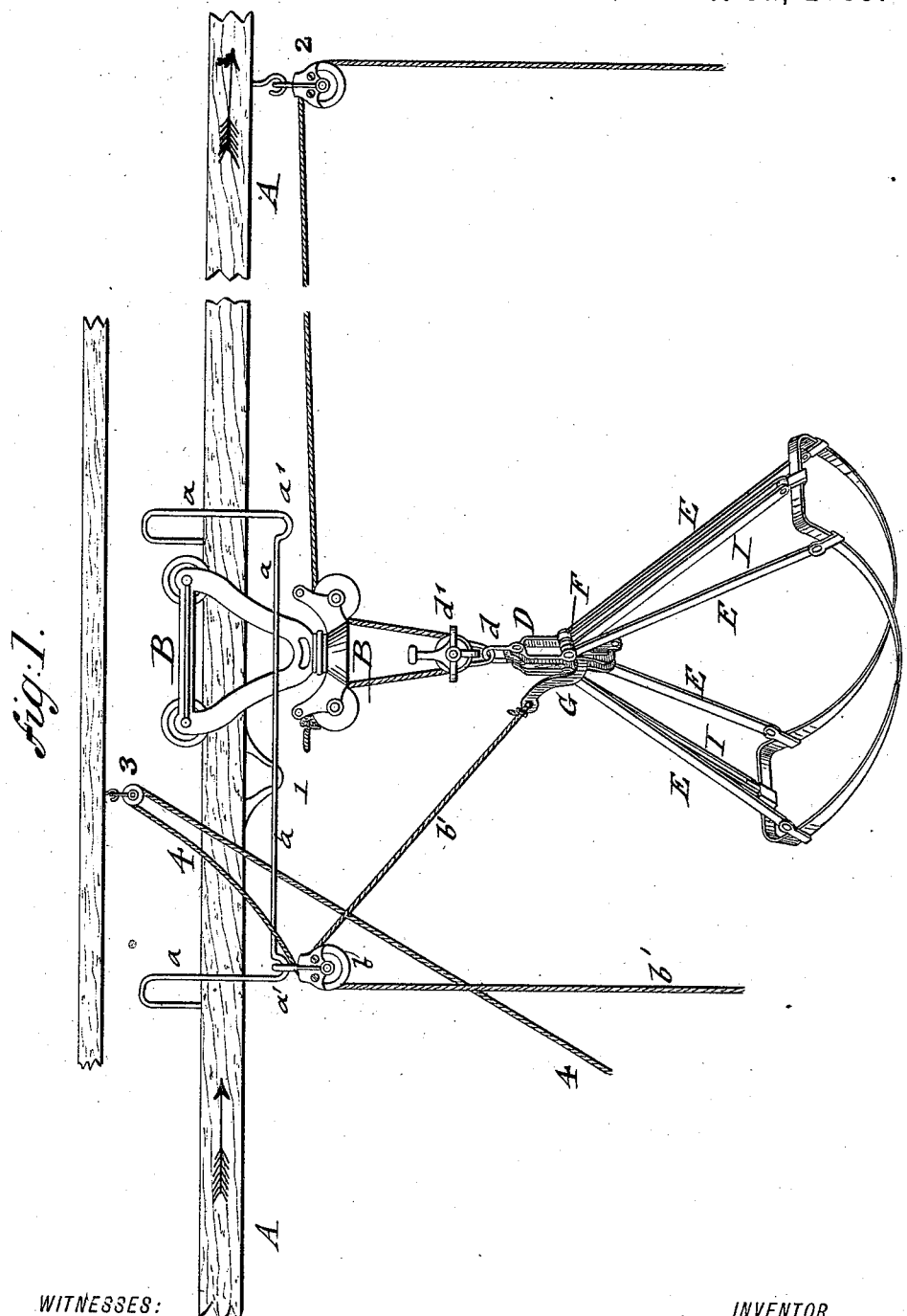
Figure 5:
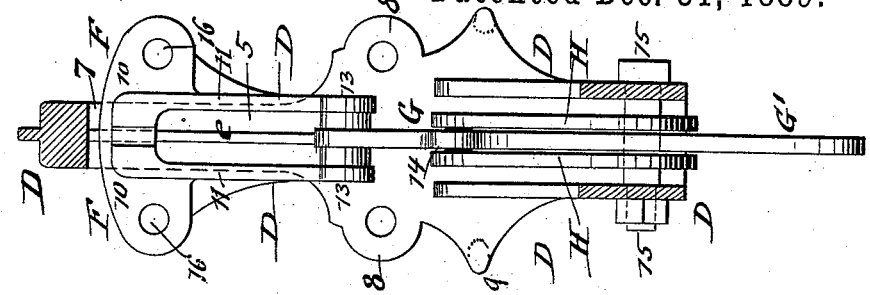
Figure 4:
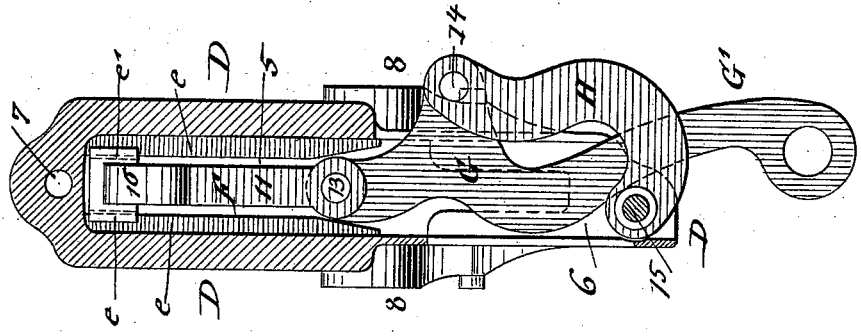
Figure 3:
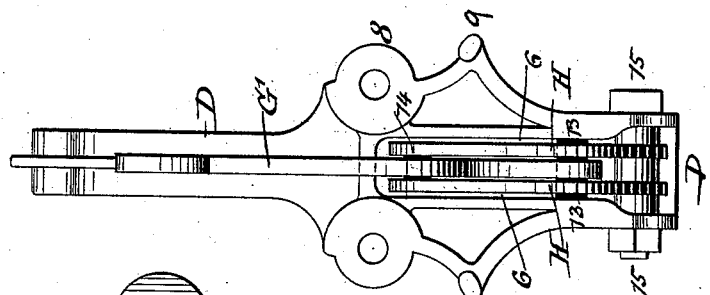
Figure 2:
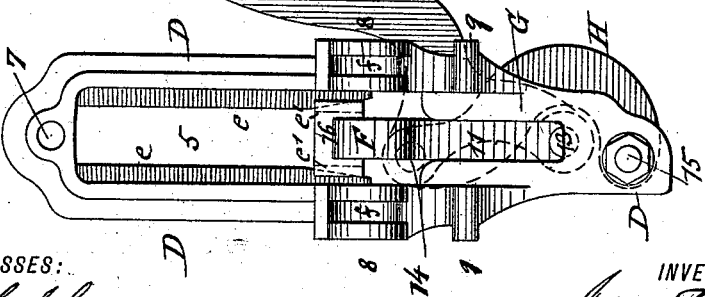

In the accompanying drawings, Figure 1 represents a perspective view of my improved drop-tine hay-fork and its attachments, showing also the manner of hanging the fork from the carriage and the mechanism for shifting the trip-rope from one side to the other of the fork. Fig. 2 is an edge view of the fork-head, showing the position which the mechanism thereof assumes when the tines are closed and locked. Fig. 3 is a side elevation of the fork-head, with the parts in the positions shown in Fig. 2. Fig. 4 is a vertical transverse section of the fork-head, the moving parts thereof being in the positions which they assume when the tines are opened. Fig. 5 is a vertical transverse section of the fork-head, taken at right angles to the section shown in Fig. 4, the moving parts of the head being in the same relative positions as in Fig. 4. Fig. 6 is a side elevation of the fork, showing the tines in open position. Fig. 7 is also a side elevation of the fork, showing the tines raised preparatory to being thrust into the hay. Fig. 8 is a side elevation of the fork, showing the position which the tines assume when depositing a load to a full mow; and Figs. 9, 9$^a$, and 9$^b$ are perspective views showing the connecting-straps of the tines and their fastening devices.

Similar letters and figures of reference indicate corresponding parts.

Referring to the drawings, A represents a fixed track, which is suspended in any suitable manner from the rafters of the barn. To the track A is attached a fixed bar $a$, which is supported by bent hangers at its ends at such a distance from the track that the fork-supporting carriage B can readily move over the track without being interfered with by the bar $a$. At each end of the shifting-bar $a$ is a notch $a'$, in one of which notches the trip-rope pulley $b$ is suspended.

To the under side of the track A is attached a stop 1, which engages the locking mechanism (not shown in the drawings) of the carriage B, so as to release the fork-head, while a pulley 2, for guiding the draft-rope, is suspended near the end of the track, said draft-rope passing over pulleys of the carriage B in the usual manner. The pulley 3 is suspended from an elevated point over the shifting-bar $a$, and a rope 4 is connected at one end to the trip-rope $b$ and passed over the elevated pulley 3. When the movement of the carriage is to be reversed, the operator grasps the lower end of the rope 4 and pulls thereon, whereby the trip-rope pulley $b$ is lifted out of the notch at one end of the shifting-bar $a$ and drawn by the trip-rope $b'$ to the notch at the opposite end of said shifting-bar, so that the trip-rope $b'$ is in position to actuate the fork from the other side when the carriage is to be run in the opposite direction over the track. The operator can thus shift the trip-rope and its pulley while standing on the floor, thus avoiding the labor and time required to ascend to the track for that purpose.

The fork-head comprises a frame D and a T-shaped slide-piece F, which moves vertically in said frame. The upper portion of the frame D has a slotted opening 5, and the lower portion thereof has an opening 6 at right angles to the slot 5. The top of the frame D is provided with holes 7 for the clevis $d$, by which the fork-head is suspended from the pulley $d'$, by which the head is locked to the carriage. The upper portion of the frame D is provided on its inner faces, opposite the slot 5, with vertical ribs $e$, along which the head of the slide-piece F is guided by grooves $e'$. In place of the ribs grooves may be used, in which case the slide-piece F would be provided with ribs in lieu of the grooves. The frame D is provided about midway of its length, on opposite sides, with perforated ears 8, provided with recesses $f$, and below said ears with projecting lugs 9, which, like the ears, are cast integral with the frame D. The slide-piece F consists of a head 10, provided with perforated ears 16 and dependent arms 11, connected at their lower ends by a pivot-pin 13.

The tines L of the fork are suspended from the fork-head by bars E, which are pivoted at their upper ends to the perforated ears 8 of the fork head frame D by means of bolts 17, said ends projecting into the recesses $f$ of said ears. The lower ends of these suspension-bars E are pivoted to straps $g$ on the tines L. Each strap is locked to its tine by a key $k$, which passes through slots $h'$ in the strap and through a notch $h$ formed in the edge of the tine at the point covered by the strap, as shown clearly in the detail figures. The spreader-bars 1 are pivoted at their upper ends to the perforated lugs 16 of the head 10 of the slide-piece F, and at their lower ends they are connected by straps $g'$ with the transverse connecting parts or heels of the tines. A trip-lever G is fulcrumed at one end to the pivot-pin 13 at the lower end of the slide-piece F and at a point 14 intermediately between its ends to the upper free ends of two toggle-links H. The lower ends of the toggle-links H are applied to a fixed pivot 15 at the lower end of the frame D. The trip-lever G is provided with an outwardly-projecting curved arm G', to which the trip-rope $b$ is attached, said trip-lever and links forming a toggle-joint by which the slide-piece F is raised or lowered. The tines are opened and closed by the action of the toggle-joint on the slide-piece and locked into closed position by the latter. The suspension-bars E are supported on the lugs 9, with which they come in contact when lowered, as shown in Figs. 6 and 7. The spreader-bars 1 are applied to the head F and swing in a plane at right angles to the plane in which the trip-lever G swings. By placing the spreader-bars 1 in the described relation to the fork-head and trip-lever the fork can be so hung that the tines swing transversely of the track, and when the fork is traveling the load is carried sidewise to the place of discharge and the trip-lever may be operated without changing the positions of the tines. By this arrangement the fork can travel until the sides of the tines arrive against the walls of the mow, so that thereby the load can be dropped at any desired point, either at the wall of the mow or between the wall and the point of unloading the hay.

When the trip-lever G is in its raised position, as shown in Fig. 2, the slide-piece F is moved downward into the lower part of the frame D of the fork-head. The pivots connecting the spreader-bars 1 with the head of the slide-piece F are then in line with the pivots by which the suspension-bars E are applied to the frame D, as shown in Fig. 2. The trip-lever G and the toggle-links H enter thereby into the space between the downwardly-extending arms 11 of the slide piece F, while the pivot 14 is moved over the center line of the pivot 13 between the slide-head and the trip-lever G, as shown in Fig 2, so that the toggle-joint produces a locking action on the slide-piece F, preventing it from moving upward in the frame D until the trip-lever is released. By pulling the trip-rope the trip-lever is moved away from the fork-head, so as to unlock the toggle-joint and permit the lifting of the slide-piece and the opening of the tines, as shown in Figs. 4 and 6. By again pulling the trip-rope the trip-lever is raised sufficiently to lower the slide-piece and close the tines, but without locking the same.

The operation of the fork is as follows: The fork is raised and run along the track from the loading to the discharging point by means of the draft-rope drawn by horse or other power. The fork can be run in either direction by passing the draft-rope over the pulley at one end of the track or at the other end. The trip-rope pulley $b$ has also to be changed from one end of the shifting-bar $a$ to the other. As the attachments are arranged in Fig. 1, the fork is moved on the track in the direction indicated by the horizontal arrows. It must be understood that in case the arrangement should be changed a pulley, like pulley 2, would be suspended from the track on the opposite side and the draft-rope carried over it, and thence to the power. When the fork arrives above the point where the hay is to be dropped, a jerky pull on the trip-rope throws the trip-lever over its center, and the weight of the load completes the opening of the tines of the fork, as shown in Fig. 6, so as to drop the load. The slide-piece F assumes then the position shown in Fig. 4. On returning the fork a pull on the trip-rope sets the trip-lever in nearly horizontal position, so as to close the tines without locking the same. When the fork arrives above the loading-point, the trip-rope is pulled and the trip-lever raised entirely, so as to lock the tines. The fork then descends until it arrives on the load of hay. The tines are then opened by taking hold of the spreader-bars, so as to assume the position shown in Fig. 7, and are then forced into the hay. The fork is then lifted by the draft-rope, the strain on the fork-head causing the closing of the tines and the grappling of the load of hay. The fork is closed and drawn back after dropping its load by the trip-rope. The tines being suspended from the ends of the bars E, the pivotal connections at 9 form the fulcrum on which they turn to discharge their load, and the spreader-bars 1 are the levers by which they are opened or closed. The tines are opened to discharge their load when released from the locking device by the weight of the load. When the tines are closed and locked, the mechanism is in the position shown in Fig. 2. The slide-piece F is then in its lowest position, with the pivots of the spreader-bars 1 in line with the pivots of the suspension-bars E, while the toggle-links are in the lower part of the slide-piece, so that the pivot 14 is beyond a vertical line passing through the axis of the pivot 13 or inside of the same. When in these relative positions, the curved lever G' is against the side of the frame, the curve or crook of the same being arranged so as to fit closely to the outside of the frame D. In this position, when the fork is loaded and closed, the leverage of the tines, acting through the spreader-bars $f$, throws the strain on the slide-piece F, but it is prevented from rising by the action of the toggle; but it can readily be seen that the lock is very sensitive, as the slightest movement of the toggle in the direction of the arrow, Fig. 2, releases the toggle or throws its upper pivot out of the line of strain, and, the slide-piece being thereby released, the spreader-bars are no longer locked and the fork is free to open and discharge its load. The tines are self-closing—that is, when they are opened by hand and thrust into the hay they become locked by the toggle. The fork is then lifted and the head drawn up, which has the effect through the spreader-bars to draw the tines toward each other and bring the points together for gripping a quantity of the hay. The fork being raised to the proper height, the carriage is automatically unlocked and moves along the track to the point where the hay is stored, where it stops, and at this point the angle of the trip-rope to the trip-lever is such that a lateral strain can be exerted upon it. The trip-rope is now pulled, thereby throwing the trip-lever out, so that the toggle-joint is caused to release the slide-piece, whereupon the tines open and discharge their load. By pulling on the trip-rope the lever is raised, the forks closed, but not locked, and the fork and carriage are drawn back along the track to the loading-point, when the fork descends again for another load. When the mow becomes about full, and there is consequently but little space for the fork to operate in—that is, the distance between the hay and the fork is such that the fork cannot clear the hay when discharging on leaving the mow—the load spreads the tines sufficiently to form a lock, as shown in Fig. 8. This is accomplished automatically by the load, which expands and presses against the tines without clearing the same. The effect of this is to make one or both tines turn back in the locked position, and when the fork is drawn upon by the trip-rope the tines do not close, and they are drawn back without closing and without dragging the hay with them. When arriving at the loading-point the tines are forced over the center out of their locked position by the trip-rope, so as to close again. They are then opened by hand by taking hold of the spreader-bars and forced into the hay, as before described.

Having thus described my invention, I claim as new and desire to secure by Letters Patent—

1. The combination of a fixed track, a bar supported sidewise of said track, a carriage traveling on said track, a hay-fork suspended from said carriage, a trip-rope connected to the trip-lever of the fork, a trip-rope pulley supported on said bar, a shifting rope connected to the trip-rope pulley, and a guide-pulley for the shifting rope suspended above the track, substantially as set forth.

2. The combination of a fork-head, suspension-bars pivoted thereto, tines supported by said suspension-bars, a slide-piece vertically movable in said head, spreader-bars pivoted to said slide-piece, and a trip-lever connected by a toggle-joint with the fork-head and slide-piece, substantially as set forth.

3. The combination of a fork-head, suspension-bars pivoted thereto, tines supported by said suspension-bars, a slide-piece movable vertically in the frame of said fork-head, spreader-bars pivoted to said slide-piece and to said tines, toggle-links pivoted to the lower end of said frame, and a trip-lever pivoted to the toggle-links and the slide-piece, substantially as set forth.

4. The combination of a fork-head having perforated ears, suspension-bars pivoted thereto, tines supported by said suspension-bars, lugs below said ears which serve as rests for the suspension-bars, a slide-piece movable vertically in the frame of said fork-head, spreader-bars pivoted to the head of said slide-piece and to said tines, toggle-links pivoted to the lower end of the frame of the fork-head, and a trip-lever pivoted to the toggle-links and the slide-piece, substantially as set forth.

5. The combination of a fork-head, a slide-piece movable vertically in the frame of said head, suspension-bars pivoted to the fork-head, tines supported by the suspension-bars, spreader-bars pivoted to the head of the slide-piece and connected with said tines, and a trip-lever connected by a toggle-joint with the fork-head and slide-piece, said trip-lever being arranged at right angles to the suspension and spreader bars, substantially as set forth.

6. The combination of a fork-head having longitudinal guide-ribs, a slide-piece in said fork-head provided with guide-grooves for said ribs, suspension-bars pivoted to the fork-head, tines supported by said suspension-bars, spreader-bars pivoted to the head of the slide-piece and connected with the tines, toggle-links pivoted to the lower end of the fork-head, and a trip-lever pivoted to the lower end of the slide-piece and the upper ends of the toggle-links, substantially as set forth.

7. The combination of a fork-head, suspension-bars pivoted to said fork-head, a slide-piece movable vertically in said fork-head, tines supported by said suspension-bars, spreader-bars pivoted to the head of said slide-piece and connected with said tines, toggle-links pivoted to the lower end of the fork-head, and a trip-lever pivotally connected with said slide-piece and toggle-links, said tines being provided at the heel and sides with fixed straps to which the other ends of the suspension and spreader bars are pivoted, substantially as set forth.

8. The combination of a fork-head having guideways, suspension-bars pivoted to said fork-head, tines supported by said suspension-bars, a T-shaped slide-piece guided vertically in said fork-head and having a slotted lower part, spreader-bars pivoted to the head of the slide-piece and to the heels of the tines, toggle-links pivoted to the lower part of the fork-head, and a curved trip-lever pivoted to the toggle-links and the slide-piece and adapted to enter with the toggle-links into the lower part of the slide-piece when the latter is locked in position, substantially as set forth.

In testimony that I claim the foregoing as my invention I have signed my name in presence of two subscribing witnesses.

JOHN FARRELL.

Witnesses:
PAUL GOEPEL,
JOHN A. STRALEY.